United States Patent Office 3,027,376
Patented Mar. 27, 1962

3,027,376
NEW VAT DYES
William Baptist Hardy, Bound Brook, and Robert Edmund Herd, Metuchen, N.J., assignors to American Cyanamid Company, New York, N.Y., a corporation of Maine
No Drawing. Filed June 8, 1953, Ser. No. 360,334
11 Claims. (Cl. 260—274)

This invention relates to vat dyestuffs having the following formula:

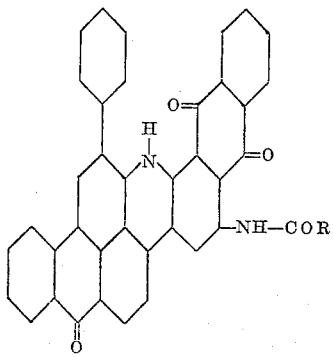

in which RCO— is a benzoyl group which may be further substituted as for example by halogen, alkoxy, alkyl, or alkylsulfonyl groups.

These compounds are various benzoyl derivatives of 4 - amino - Bz-1'-alphaanthraquinonylamino-Bz-2'phenyl benzanthrone 2,2'-acridine. The parent ring will be referred to more briefly in the specification as Bz-2'-phenylbenzanthrone anthraquinone acridine.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War, observation by means of infrared radiation completely changed the problem of camouflage because, while dyes of excellent fastness and dull drab shades under visible light were generally used for the dyeing of uniforms, all of the fast dyes with otherwise desirable properties showed high infrared reflectance in the infrared and therefore soldiers wearing uniforms dyed with these dyes when observed under infrared radiation, for example by means of devices such as nooperscopes and sniperscopes, stood out against average terrain making discovery easy and presenting excellent targets.

Extensive investigations have shown that to be effective under infrared observation, dyed fabrics must show an infrared reflectance which is relatively low, preferably below 25%, but which of course should not be too low. In other words in average terrain, a soldier to be effectively concealed or to present a poor target should appear no lighter than the background and while it is undesirable that a soldier should appear much darker, any difference in infrared reflectance from that of the terrain should be in the darker rather than on the lighter side.

There are known some dyes, for example some sulfur dyes, which exhibit low infrared reflectance. These dyes, however, have such inferior fastness to light and to the rather drastic washing conditions in the field that they are not practical. On the other hand, vat dyes which show satisfactory light and wash fastness have, in the past, also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

The dyestuffs of the present invention have low infrared reflectance and are sufficiently fast to light, washing, et cetera, to afford acceptable permance under military field conditions. The visible shade is such that they can be easily blended to the proper shade for uniforms and other military use and their infrared reflectance is so low that they can be used with dyes of higher infrared reflectance to produce blends having satisfactorily low infrared reflectance.

The compounds are prepared by acylating a 4-amino-Bz-2'-phenylbenzanthrone anthraquinone acridine, which is in turn a new chemical compound and is included within the scope of the present invention. The acylating agents which are suitable for use in preparing the compound of the present invention include the acid chlorides or anhydrides of benzoic acid, o-toluic acid, p-toluic acid, o-methoxybenzoic acid, p-methoxybenzoic acid, p-ethoxybenzoic acid, o-butoxybenzoic acid, m-methylsulfonylbenzoic acid, p-butysulfonylbenzoic acid, o-chlorobenzoic acid, 2,4-dichlorobenzoic acid, and o-bromobenzoic acid.

The invention will be described in greater detail in conjunction with the following specific examples, in which the parts are by weight unless otherwise specified.

*Example 1*

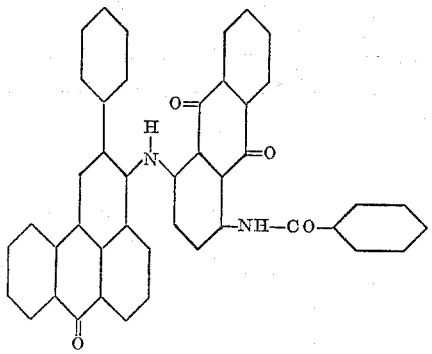

A mixture of 40 parts of Bz-1-bromo-Bz-2-phenylbenzanthrone (M.P. 250–252° C. and prepared by bromination of Bz-2-phenylbenzanthrone in nitrobenzene), 46 parts of 1-amino-4-benzolylaminoanthraquinone, 10 parts of cupric acetate, 61 parts of sodium acetate, and 2,100 parts of nitrobenzene is stirred at reflux until the reaction is substantially complete. 900 parts of solvent are then distilled out and the mixture is cooled to 90° C., diluted with 600 parts of alcohol, and then cooled to room temperature. The violet brown crystalline product is isolated by filtering, washing with alcohol, boiling in dilute hydrochloric acid slurry, followed by refiltering and washing. It gives a red brown color in sulfuric acid solution.

*Example 2*

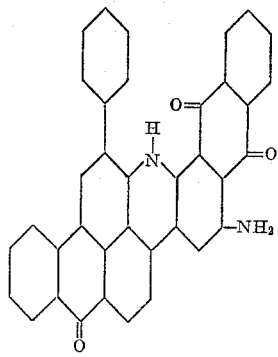

37 parts of the product of Example 1 are added to a mixture of 178 parts of methanol and 333 parts of caustic potash, held at 150° C. The mixture is stirred at 150° C.

until the reaction is substantially complete. It is then drowned in 4,000 parts of ice water, and the resultant slurry is aerated until the product has precipitated. The latter is isolated by filtration and washed neutral. It dissolves in sulfuric acid with a green coloration.

*Example 3*

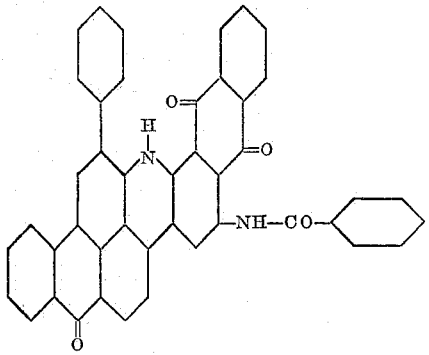

A mixture of 28.5 parts of the product of Example 2, 10 parts of benzoylchloride, 2 parts of pyridine, and 60 parts of nitrobenzene is stirred at 145–150° C. until the reaction is substantially complete. It is cooled and diluted with 120 parts of alcohol. The product is isolated by filtration and washed with alcohol. It is purified by boiling in 50 parts of pyridine, reisolated by filtration and washed with hot pyridine and alcohol. The dye dissolves in sulfuric acid with an olive green coloration and dyes cellulose fibers an olive shade of good fastness and low infrared reflectance.

*Example 4*

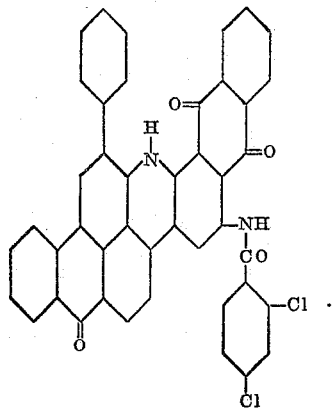

18 parts of the product of Example 2, 3 parts of pyridine, 300 parts of nitrobenzene, and 31 parts of 2,4-dichlorobenzoyl chloride are heated together at 145–150° C. until the reaction is substantially complete. The product is then isolated as described in Example 3. The product dyes cotton olive shades of good fastness properties and low infrared reflectance.

*Example 5*

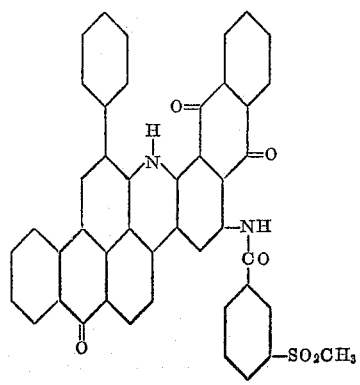

The procedure of Example 4 is followed using 36 parts of meta-methylsulfonylbenzoyl chloride in place of the dichlorobenzoyl chloride. A brownish cast solid is obtained which dissolves to a green color in sulfuric acid. It dyes textile materials an olive shade of good fastness properties and low infrared reflectance.

*Example 6*

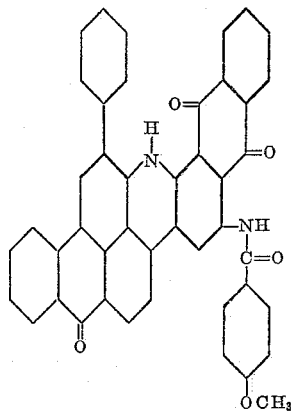

The procedure of Example 4 is followed using para-methoxybenzoyl chloride instead of the dichlorobenzoyl chloride. An olive dye is obtained with properties similar to the product of Example 5.

We claim:
1. Compounds of the formula:

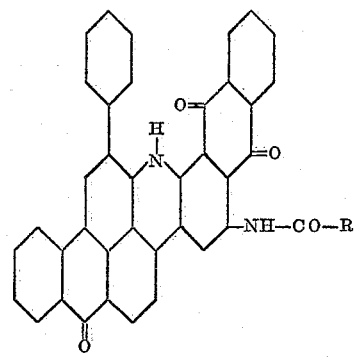

in which R—CO is a benzoyl group.
2. Compounds according to claim 1 in which the benzoyl group is halogenated.
3. Compounds according to claim 2 in which the halogen is chlorine.
4. A compound according to claim 3 in which the benzoyl group is 2,4-dichlorobenzoyl.
5. Compounds according to claim 1 in which the benzoyl group is substituted by an alkoxy group containing less than five carbon atoms.
6. Compounds according to claim 5 in which the alkoxybenzoyl group is a para-alkoxybenzoyl group.
7. A compound according to claim 6 in which the p-alkoxybenzoyl group is p-methoxybenzoyl.
8. Compounds according to claim 1 in which the benzoyl group is an alkylbenzoyl group.
9. Compounds according to claim 1 in which the benzoyl group is an alkylsulfonylbenzoyl group.
10. A compound according to claim 9 in which the alkylsulfonylbenzoyl group is m-methylsulfonylbenzoyl.
11. A compound according to claim 1 in which the benzoyl group is unsubstituted.

No references cited.